United States Patent [19]
Cook et al.

[11] Patent Number: 5,423,026
[45] Date of Patent: Jun. 6, 1995

[54] METHOD AND APPARATUS FOR PERFORMING CONTROL UNIT LEVEL RECOVERY OPERATIONS

[75] Inventors: Thomas E. Cook, Red Hook; Marten J. Halma, Poughquag; Allan S. Meritt, Poughkeepsie; Harry M. Yudenfriend, Wappingers Falls, all of N.Y.

[73] Assignee: International Business Machines Corporation, Armonk, N.Y.

[21] Appl. No.: 755,200

[22] Filed: Sep. 5, 1991

[51] Int. Cl.6 ............................................. G06F 11/00
[52] U.S. Cl. ............................................. 395/575; 371/12
[58] Field of Search ........................ 371/12, 7; 395/575

[56] References Cited

U.S. PATENT DOCUMENTS

| | | | |
|---|---|---|---|
| 3,303,476 | 2/1967 | Moyer | 340/172.5 |
| 3,688,274 | 8/1972 | Cormier | 340/172.5 |
| 4,075,693 | 2/1978 | Fox | 364/200 |
| 4,205,374 | 5/1980 | Bardsley, III et al. | 364/200 |
| 4,207,609 | 6/1980 | Luiz | 364/200 |
| 4,386,400 | 5/1983 | Cope et al. | 364/200 |
| 4,396,984 | 8/1983 | Videcki, II | 364/200 |
| 4,403,288 | 9/1983 | Christian | 364/200 |
| 4,674,038 | 6/1987 | Brelsford | 364/200 |
| 4,697,232 | 9/1987 | Brunelle | 364/200 |
| 4,970,640 | 11/1990 | Beardsley | 364/200 |
| 5,107,489 | 4/1992 | Brown | 370/58.2 |
| 5,107,496 | 4/1992 | Cook | 371/11.3 |
| 5,170,472 | 12/1992 | Cwiakala | 395/275 |
| 5,197,069 | 3/1993 | Cook | 371/7 |

OTHER PUBLICATIONS

IBM Technical Disclosure Bulletin, R. J. Dugan and R. R. Guyette vol. 22, No. 1, pp. 248–250 (1979).

*Primary Examiner*—Robert W. Beausoliel, Jr.
*Assistant Examiner*—Glenn Snyder
*Attorney, Agent, or Firm*—Heslin & Rothenberg

[57] ABSTRACT

Control unit level reset operations in systems having switched point-to-point I/O interface topologies is accomplished by determining and storing channel path identification numbers (CHPID's) and control unit link addresses (CULA's) for each device in the system, scanning this stored data to find devices whose CHPID's and CULA's match the CHPID and CULA for a device or a control unit having a reported error, quiescing devices with such matching CHPID's and CULA's, issuing a control unit level reset command and reactivating the quiesced devices. For systems having both multidropped and switched point-to-point topologies, provision is made for preliminarily determining whether a given control unit reset can be performed on the control unit level.

20 Claims, 11 Drawing Sheets

| WORD 0 | '0010' | '0002' | |
|---|---|---|---|
| 1 | 00000000 00000000 00000000 | | F CHPID |
| 2 | 00000000 00000000 00000000 | | L CHPID |
| 3 | 00000000 00000000 00000000 00000000 | | |

| WORD 0 | L2 | RESPONSE CODE |
|---|---|---|
| 1 | 00000000 00000000 00000000 00000000 | |
| 2 | CHANNEL-PATH DESCRIPTION BLOCK | |
| 4 | ⋮ | |
| n | | |

| WORD 0 | VF | 0000 | LSN | DESC | CHPID |
|---|---|---|---|---|---|
| 1 | SWLA | 00000000 | CHLA | 00000000 | |

| WORD 0 | '0010' | '0001' |
|---|---|---|
| 1 | 00000000 00000000 00000000 | CHPID |
| 2 | 00000000 00000000 | SUBCHANNEL NUMBER |
| 3 | 00000000 00000000 00000000 00000000 | |

| WORD 0 | '0008' | RESPONSE CODE |
|---|---|---|
| 1 | 00000000 00000000 00000000 00000000 | |

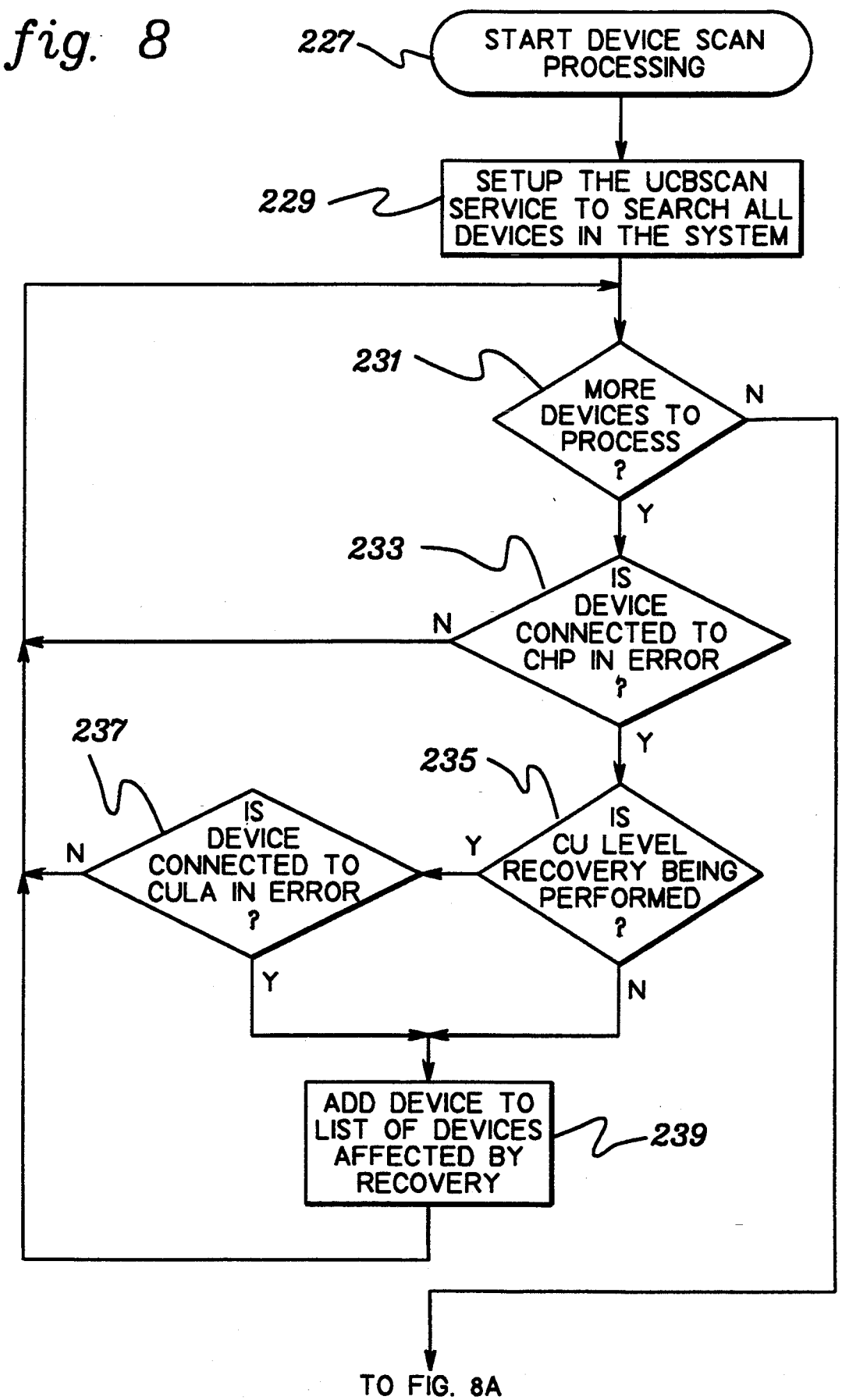

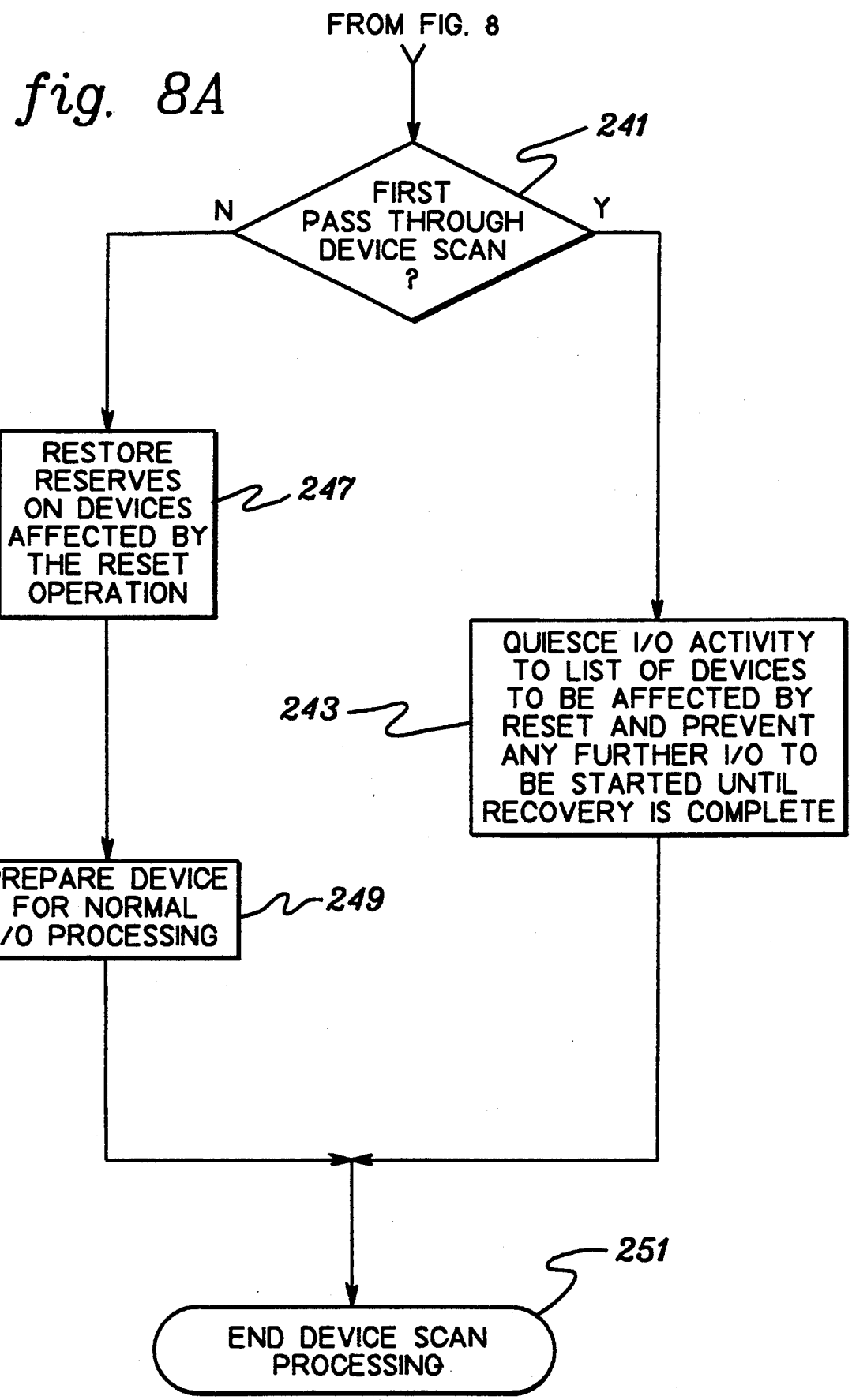

METHOD AND APPARATUS FOR PERFORMING CONTROL UNIT LEVEL RECOVERY OPERATIONS

This invention relates to a method and an apparatus for performing control unit level recovery operations in a data processing system.

BACKGROUND OF THE INVENTION

Recovery operations, some requiring a reset, are generally performed today at the channel path level. Those skilled in the art are familiar with the need to conduct recovery operations upon the occurrence of certain error conditions. Two examples of these errors are: (1) the so-called "hot I/O" which is a hardware malfunction which occurs when a device repeatedly presents the I/O subsystem with unsolicited interrupts and (2) a reset event which is a hardware error condition which occurs when a control unit signals the I/O subsystem that a system reset has occurred. The reset event signal is generally given when the software attempts I/O operations on the interface where the reset previously occurred. Hot I/O and reset event conditions are conditions whose scope is limited to the control unit level. Since no method exists today to isolate control unit level errors to the control unit in error, it is necessary to perform recovery at the channel path level.

Programming systems such as IBM's MVS provide error detection logic to detect these conditions and the system architecture provides instructions that allow for various levels of error recovery. One of the options presently available for error recovery is the reset channel path (RCHP) instruction. This instruction is described in IBM publication SA22-7200 IBM Enterprise System Architecture/370. The RCHP instruction allows the program to issue a system reset signal on the channel path to which the control unit is attached. The system reset signal frequently causes special micro-code to be executed in the control unit (typically re-initialization) which has proven successful in recovering from these failures. During the channel path recovery operation, all devices connected to the channel path being recovered suffer a service outage. All I/O to the devices is suspended until recovery is complete and the paths to the devices have been reinitialized. Furthermore, if just one device is shared among multiple systems, there may be a need to stop all sharing processors in order to ensure that data integrity is maintained during the recovery. If recovery operations could be limited to the control unit to which the reporting device is connected, considerable processing time could be saved.

The introduction of I/O architecture and topologies permitting communications directly with individual control units presents an opportunity to reduce some of the disruption and other inconveniences associated with system resets. Unfortunately, there are no available methods for initiating control unit level recovery operations. Furthermore, the problem is complicated by the fact that many systems today employ both multi-dropped and switched point-to-point I/O interface topologies.

It is, therefore, an object of this invention to provide a method and apparatus for effecting control unit level reset operations which will not cause a disruption in the activities of other control units which may be connected to the same channel.

It is a further object of this invention to provide a method and an apparatus for conducting reset operations in a more efficient way so that fewer of them will actually be required in the operation of a data processing system.

It is a further object of this invention to provide more granular error recovery from control unit/device failures, thus exploiting the switched point-to-point I/O topology such as that employed by IBM's ESCON I/O interface.

Finally, it is an object of this invention to provide a method and an apparatus for initiating either channel path recovery operations or control unit recovery operations as may be appropriate in systems employing both multi-dropped and switched point-to-point I/O interface topologies.

SUMMARY OF THE INVENTION

The method of this invention comprises the steps of determining and storing the numbers of the channel paths (CHPID's) and control unit link addresses (CULA's) at initialization time, determining for an intended control unit level reset which devices in the system will be affected, suspending I/O activity of those devices, formulating the control unit reset command and subsequently reactivating I/O activity of the affected devices. For systems having multidropped and switched point-to-point I/O interface topologies, an additional preliminary step is taken to determine whether a needed reset can be performed at the control unit level.

The apparatus of this invention includes means for determining and storing all CHPID's and CULA's for each device in the system, means for scanning the stored CHPID's and CULA's to determine which devices in the system have CHPID's and CULA's matching the CHPID and CULA for a device or a control unit having a reported error, means for suspending I/O activity of the devices with matching CHPID's and CULA's, means for formulating a reset control unit command addressed to the control unit needing to be reset, means for transmitting such command and means for reactivating I/O activity of the quiesced devices. In systems having mixed multidropped and switched point-to-point I/O interface topologies, means are provided for preliminarily determining whether a needed control unit reset can be performed at the control unit level.

BRIEF DESCRIPTION OF THE DRAWINGS

FIGS. 2A and 2B show the format of the command-request and command-response blocks used in the Channel Subsystem Call (CHSC) entitled "store-channel-path-description".

FIG. 2C shows the format of the channel-path-description block.

FIGS. 2D and 2E show the format of the command-request and command-response blocks used in the Channel Subsystem Call (CHSC) command entitled, "Reset-Control-Unit".

FIG. 8 is flowchart illustrating the process steps followed in performing a scan of the UCB's prior to and after performing a recovery.

DESCRIPTION OF THE PREFERRED EMBODIMENT

Figure 1:
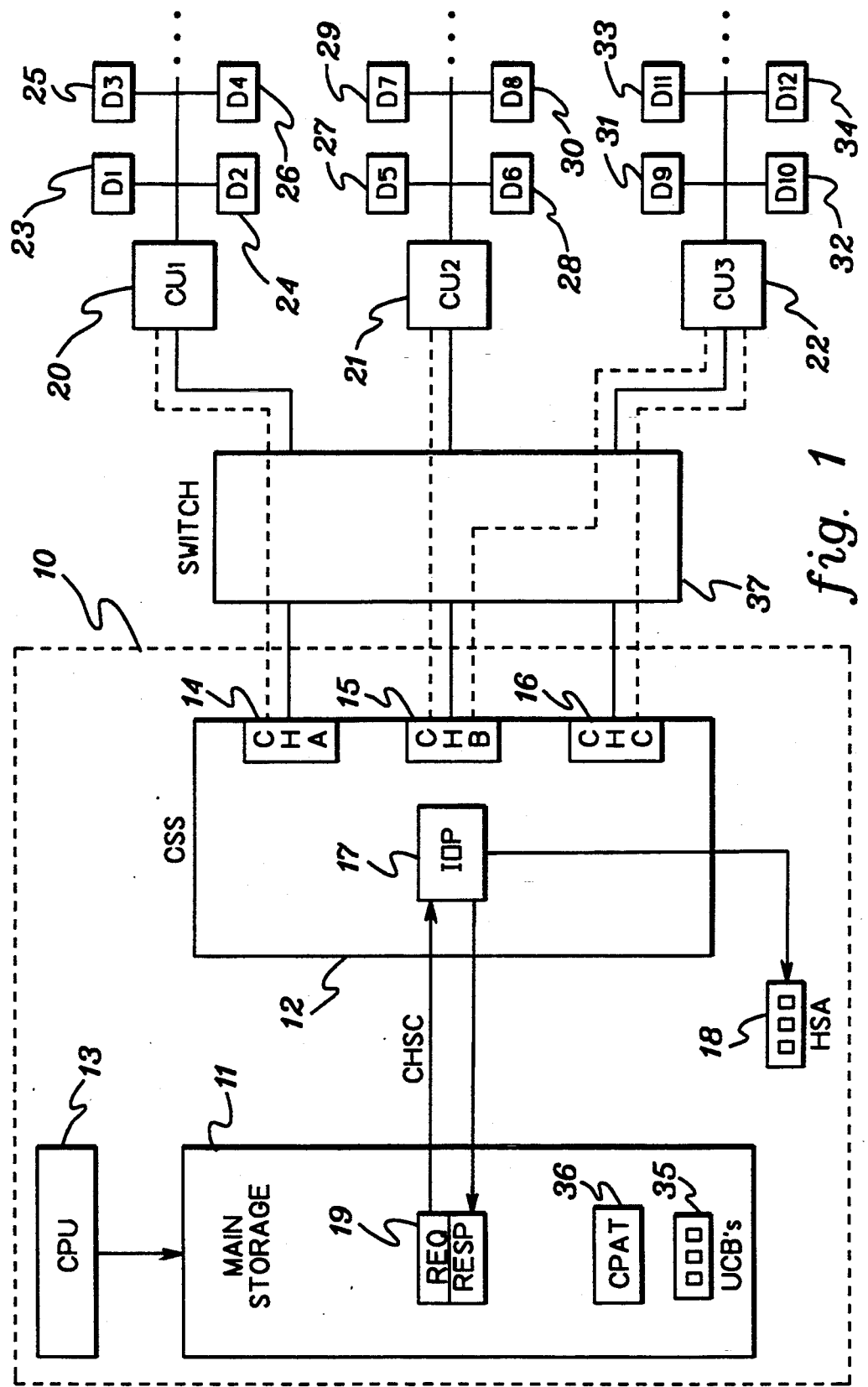
FIG. 1 is a block diagram showing a data processing I/O system of the present invention having a computer with a main storage and a channel subsystem.

FIG. 1 is a block diagram showing a data processing I/O system of the present invention, wherein the data processing system includes a computer 10 having a central processing unit 13, a main storage 11 and a channel subsystem (CSS) 12. The main storage 11 contains data and data instructions arranged in software programs, including an operating system, such as IBM's MVS/ESA for the processing of data. The operating system and I/O programs in main storage 11 are referred to herein as the operating system, or the program, or software.

The mentioned CSS 12 has multiple channels, such as channels 14, 15 and 16 designated herein as channels A, B and C, respectively. As is well known in the art, I/O programs are set up in the main storage 11 and then executed by the CSS by means of channel control words (CCW's) for conducting I/O operations. Additional communications between the software and the CSS are provided by issuing Channel Subsystem Call (CHSC) commands, as disclosed in the commonly assigned U.S. Pat. No. 5,170,472 entitled, "Dynamically Changing a System I/O Configuration Definition" by R. Cwiakala, et al., which patent is hereby incorporated by reference. Certain CHSC commands are described in another commonly assigned patent application Ser. No. 07/754,859 entitled "Establishing and Restoring Resources in a Data Processing I/O System" by Cook, et al. to be filed on or about Sep. 4, 1991, the contents of which are hereby incorporated herein by reference. The subject invention involves the execution of a new CHSC reset-control-unit (RCU) command.

The channel subsystem includes an I/O processor 17 and a data storage area which contains the system's hardware system area storage (HSA) 18. The HSA 18 is a storage area which contains data defining the configuration of the system hardware, and is typically in a non-program addressable part of the memory contained in main storage 11. For this reason, the HSA 18 is shown as separate from the main storage 11 and may be thought of as a separate part of the channel subsystem 12.

In the embodiment of FIG. 1, each of the channels A, B and C are connected to ports of a dynamic switch 24, which has other ports connected to control units 20, 21 and 22. The dynamic switch 18 may be as described in U.S. Pat. No. 5,107,489 for Switch and its Protocol for Making Dynamic Connections, and assigned to the assignee of the present invention, said patent being incorporated hereby by reference.

Each channel 14–16 has a channel path which is identified by a channel path identification (CHPID). Each CHPID represents the path from a channel to a connected control unit. A link is a point-to-point transmission medium, such as a pair of conductors (optical fibers) that physically interconnects, in the embodiment of FIG. 1, a control unit and a channel, a channel and the dynamic switch, or a control unit and the dynamic switch. Each link is identified by a link address. It will thus be understood that a CHPID may have more than one link, such as a first link from a channel to one port of the dynamic switch, and a second link from a connected port of the dynamic switch to a particular control unit.

A logical path is the relationship that exists between a channel and a control unit for device-level communication during execution of an I/O operation and presentation of status. The establishment of logical paths is disclosed in U.S. patent application Ser. No. 07/576,561 filed Aug. 31, 1990 for Logical Channel Paths in a Computer I/O System, assigned to the assignee of the present invention and incorporated herein by reference.

In the embodiment of FIG. 1, there is a channel path between channel A and control unit 20, a channel path between channel B and control unit 21, a channel path between channel B and control unit 22 (through a different link), and a channel path between channel C and control unit 22. The dotted lines between the channels and the control units represent logical paths. There is a logical path between channel A and control unit 20, a logical path between channel B and control unit 21, a logical path between channel B and control unit 22, and a logical path between channel C and the control unit 22.

Also shown in FIG. 1 are a number of peripheral I/O devices 23–34 connected to the control units 20–22. It will be appreciated by those skilled in the art that the topology of the I/O interface illustrated in FIG. 1 is serial and is typical of that found in IBM's ESCON I/O interface which is described in IBM publication SA22-7202-00 entitled, "Enterprise Systems Architecture/390, ESCON I/O Interface", hereby incorporated herein by reference. One of the chief differences between a topology of this type and one which employs a parallel I/O interface is that the serial attachment of control units, as illustrated in FIG. 1, permits the sending of data and instructions over a channel path to a single control unit without affecting the other control units. For example, it is possible to send data and instructions to control unit 20 (CU1) without affecting control units 21 (CU2) or control unit 22 (CU3). With a parallel I/O interface, however, this is not possible because several control units are connected directly to particular channels without the intervention of a device such as dynamic switch 24.

Those skilled in the art realize that with the parallel I/O interface topology of systems such as IBM's System 360/370 a "reset" signal must be directed to all devices/control units on the channel. This results in unnecessary disruption because in many cases the problem could be remedied by merely resetting a group of devices attached to a single control unit. The subject invention is intended to take advantage of IBM's ESCON I/O interface architecture in those circumstances where an error can be corrected with a control unit level reset operation.

In the flowcharts appearing in FIGS. 4–9, there are steps involving the execution of the CHSC commands entitled, "Store-Channel-Path-Description", and "Reset-Control-Unit". The command and information blocks associated with the execution of these instructions are set forth in FIGS. 2A–2E and will be described below. Other pertinent CHSC commands are similarly illustrated and described in the above-mentioned commonly assigned IBM patent application Ser. No. 07/754,859 entitled, "Establishing and Restoring Resources in a Data Processing I/O System". The purpose for these commands will be apparent from a review of the flowcharts in FIGS. 4–9 and the associated description set forth below. The store-channel-path-description command is used to obtain the link addresses that are assigned to the channel link-level facilities of a specified range of channel paths. FIG. 2A shows the format of the command-request block for the store-channel-path-description command wherein:

L1: Bytes 0–1 of word 0 contain the value of 0010 hex, specifying a command-request-block length of 16 bytes.

Command Code: Bytes 2–3 of word 0 contain the value 0002 hex, specifying the store-channel-path-description command.

Reserved: Bits 0–23 of words 1–2, and word 3 must be zeros.

First CHPID: Byte 3 of word 1 specifies the CHPID identifying the first channel path for which information is requested.

Last CHPID: Byte 3 of word 2 specifies the CHPID identifying the last channel path for which information is requested. The value for the last CHPID is equal to or greater than the value for the first CHPID.

FIG. 2B shows the format of the command-response block for the store-channel-path-description command wherein:

L2: Bytes 0–1 specify the length in bytes of the command-response block. The length depends on the response code that is stored as a result of the attempt to execute the store-channel-path-description command.

If a response code other than 0001 hex is stored in the response-code field (bytes 2–3 of word 0), no channel-path-description blocks are stored as a result of the attempt to execute the command, and L2 specifies a length of eight bytes for the command-response block.

If a response code of 0001 hex is stored in the response-code field (bytes 2–3 of word 0) at least one channel-path-description block is stored in the command-response block as a result of the attempt to execute the command, and L2 specifies a command-response-block length of eight bytes plus eight bytes for each of the channel-path-description blocks that are stored.

Response Code: Bytes 2–3 of word 0 contain a 16-bit unsigned binary integer that describes the results of the attempt to execute the store-channel-path-description command. The valid response codes are 0001, 0003, and 0004 hex.

Reserved: Word 1 is zero.

Words 2–n: When response code 0001 hex is stored, up to 256 eight-byte channel-path-description blocks are stored in the response-data area of the command-response block. The number of channel-path-description blocks stored depends on: the number of CHPID's in the range specified in the command-request block, conditions in the channel subsystem when CHSC is executed, and the channel-subsystem model. At least one channel-path-description block is stored, and the actual number of blocks stored is determined by subtracting eight bytes from the size of the command-response block and dividing the remainder by 8.

Channel-path-description blocks are stored for some or all of the specified CHPID's, beginning with the CHPID specified by the first-CHPID field. Channel-path-description blocks are stored sequentially in ascending order.

FIG. 2C shows the format of a channel-path-description block wherein:

Validity Flags (VF): Bits of 0–3 of word 0 contain validity flags for corresponding fields in the channel-path-description block:

CHPID Valid: Bit 0 of word 0, when one, indicates that the specified CHPID is valid because it has been defined to the channel subsystem. Bit 0, when zero, indicates that the specified CHPID is not valid because it has not been defined to the channel subsystem, and the contents of the remainder of the block, except for the contents of the CHPID field, have no meaning.

Channel-Link Address Valid: Bit 1 of word 0, when one, indicates that the channel-link-address field (see below) is valid. Bit 1, when zero, indicates that there is no link address associated with the specified CHPID, and the contents of the channel-link-address field have no meaning.

Logical-Switch Number Valid: Bit 2 of word 0, when one, indicates that the number in the logical-switch-number field (see below) is valid. Bit 2, when zero, indicates that a logical-switch number has not been defined to the channel subsystem for the specified CHPID.

Switch-Link Address Valid: Bit 3 of word 0, when one, indicates that the switch-link-address field (see below) is valid. Bit 3, when zero, indicates that there is no switch addached to the specified CHPID or that the link address of the dynamic switch cannot be determined.

Reserved: Bits 4–7 of word 0 and bits 8–15 and 24–31 of word 1 are reserved and stored as zeros by the channel subsystem.

Logical-Switch Number (LSN): Bits 8–15 of word 0 indicate the logical-switch number of the switch, if any, that is attached through the corresponding channel-path link address.

Descriptor Field (DESC): Bits 16–23 of word 0 provide a description of the channel path that is associated with the specified CHPID. The valid combinations of bits are as follows:

| Bits 01234567 | Function |
| --- | --- |
| 00000000 | Channel-path description not known |
| 00000001 | Parallel-block multiplexer channel path |
| 00000010 | Parallel byte-multiplexer channel path |
| 00000011 | Serial point-to-point channel path |
| 00000100 | Serial channel path (incomplete description)[2] |
| 00000101 | Serial switch-point-to-point channel path |

| Bits<br>01234567 | Function |
| --- | --- |
| 00000110 | Fiber-extended channel path[1] |
| 00000111 | Native interface |
| 00001000 | Channel-to-channel adapter point-to-point[1] |
| 00001001 | Channel-to-channel adapter switched-point-to-point |
| 00001010 | Channel-to-channel adapter (incomplete description)[2] |
| Other bit combinations are not defined. | |

[1]Includes static connection through a dynamic switch
[2]It is not yet determined (initialization process not complete) whether the channel path is attached to a port of a dynamic switch that can be dynamically connected to other ports of the switch.

CHPID: Byte 3 of word 0 specified the CHPID of the channel path to which the information in this channel-path-description block applies.

Switch Link Address (SWLA): Byte 0 of word 1 contains the link address assigned to the control-unit link-level facility of the dynamic switch. This is used as the destination link address when attempting to communicate with the dynamic-switch control unit on the specified channel path.

Channel Link Address (CHLA): Bits 16–23 of word 1 indicate the link address assigned to the channel-subsystem link-level facility of the specified channel path. This is used by Control units as the destination link address when attempting to communicate with the channel subsystem on the specified channel path.

SPECIAL CONDITIONS

A special condition exists if a response code other than 0001 hex is stored in the command-response block, indicating that the execution of the command is suppressed. The special conditions for the store-channel-path-description command are as follows:

'0003': Response code 0003 hex is store if the L1 field contains a value other than 0010 hex, if bits 0–23 of words 1–2, and word 3 are not all zeros, or if the last-CHPID field is less than the first-CHPID field.

'0004': Response code 0004 hex is stored if the command is not installed on the model. The reset-control-unit (RCU) command is used to cause a system reset to be performed at a designated control unit on a specified channel path. The control unit is determined by the CHPID and subchannel-number fields in the command-request block. The device associated with the subchannel is attached to the designated control unit.

FIG. 2D shows the format of the command-request block for the reset-control-unit command wherein:

L1: Bytes 0–1 of word 0 contain the value 0010 hex, specifying a command-request-block length of 16 bytes.

Command Code: Bytes 2–3 of word 0 contain the value 0001 hex, specifying the reset-control-unit command.

Reserved: Bits 0–23 of word 1, bits 0–15 of word 2, and word 3 must be zeros.

CHPID: Byte 3 of word 1 specifies the CHPID identifying the channel path on which the device-level system reset is to be performed.

Subchannel Number: Bytes 2–3 of word 2 specify the subchannel number identifying a device attached to the control unit that is to receive the device-level system reset.

FIG. 2E shows the format of the command-response block for the reset-control-unit command wherein:

L2: Bytes 0–1 of word 0 contain the value 0008 hex, specifying a command-response-block length of eight bytes.

Response Code: Bytes 2–3 of word 0 contain a 16-bit unsigned binary integer that describes the results of the attempt to execute the reset-control-unit command. The valid response codes are 0001, 0003, 0004, 0102, and 0103 hex.

Reserved: Word 1 is zero.

SPECIAL CONDITIONS

A special condition exists if a response code other than 0001 hex is stored in the command-response block, indicating that the execution of the command is suppressed. The special conditions for the reset-control-unit command are as follows:

'0003': Response code 0003 hex is stored if the L1 field contains a value other than 0010 hex or if bits 0–23 of word 1, bits 0–15 of word 2, and word 3 are not all zeros.

'0004': Response code 0004 hex is stored if the command is not installed on the model.

'0102': Response code 0102 hex is stored if either the channel path or the subchannel specified in the request-parameters field is not defined to the channel subsystem, if the subchannel has no valid device number assigned to it, if the subchannel does not have access to the channel path, or if the channel path is of the type that is incapable of performing a system reset at a single control unit.

'0103': Response code 0103 hex is stored if the specified channel path is not physically available (the corresponding PAM bit in the specified subchannel is set to zero).

Figure 3A:
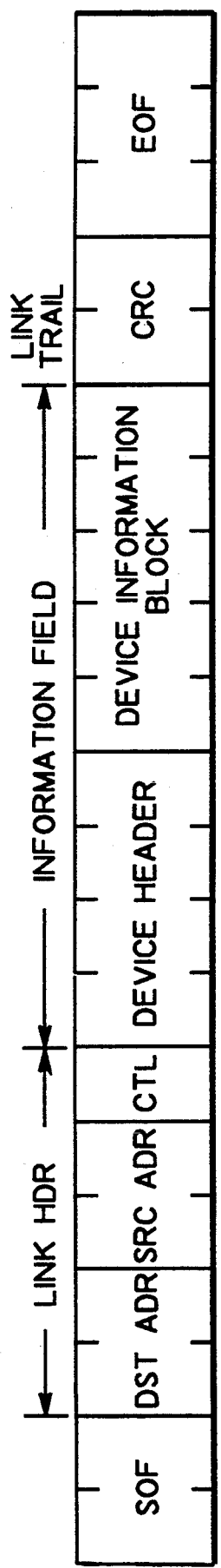
FIGS. 3A and 3B show the format of the frame issued by the I/O processor of the channel subsystem in practicing the subject invention.
Figure 3B:
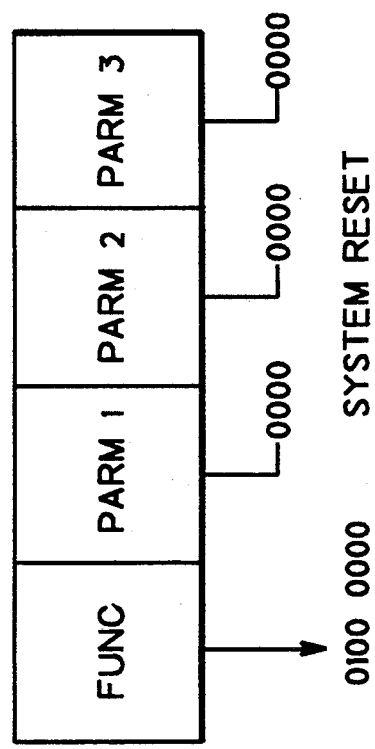

FIGS. 3A and 3B illustrate the form of a frame which is sent from I/O processor 17 to switch 37 over a particular channel path to effect a control unit level recovery operation. It may be sent, for example, by channel 15 (CHB) through switch 37 to control unit 21 (CU2). This is accomplished, as will be discussed below by indicating in the frame the link address of control unit 21 (CU2). Because the link address is specific to control unit 21 (CU2), only control unit 21 (CU2) will receive and carry out the instructions contained in the frame. The other control units will not be affected.

The bits of the frame depicted in FIG. 3A are sent serially. The illustrated sections of the frame have the following purposes and meanings:

SOF: start of frame delimiter
DST ADR: destination link address
SRC ADR: source link address
CTL: control bits
00000000: indicates a device level frame
Device Header: contains an indication as to whether the frame is address specific, i.e., pertains to a single device or the entire control unit, and whether the frame is a control frame. System reset is a control frame that is not address specific.
Device Information Block: shown in enlarged form in FIG. 3B, contains the function code indicating system reset (0100). The remaining device information block fields are 0 for system reset.
Link Trailer: switch link redundancy check.
EOF: end of frame delimiter.

Those skilled in the art will appreciate that the above described frame is effective to cause a system reset in the control unit accessed through the specified destination link address. Additional background information concerning this frame can be found in IBM publication "Enterprise System Architecture/390, ESCON I/O Interface", publication number SA22-7202-00, especially pages 6-19 and 7-14 to 7-17.

The process steps of this invention will now be described with reference to the flowcharts set forth in FIGS. 4–9.

Building Channel Path Attribute Table (CPAT)

Figure 4:
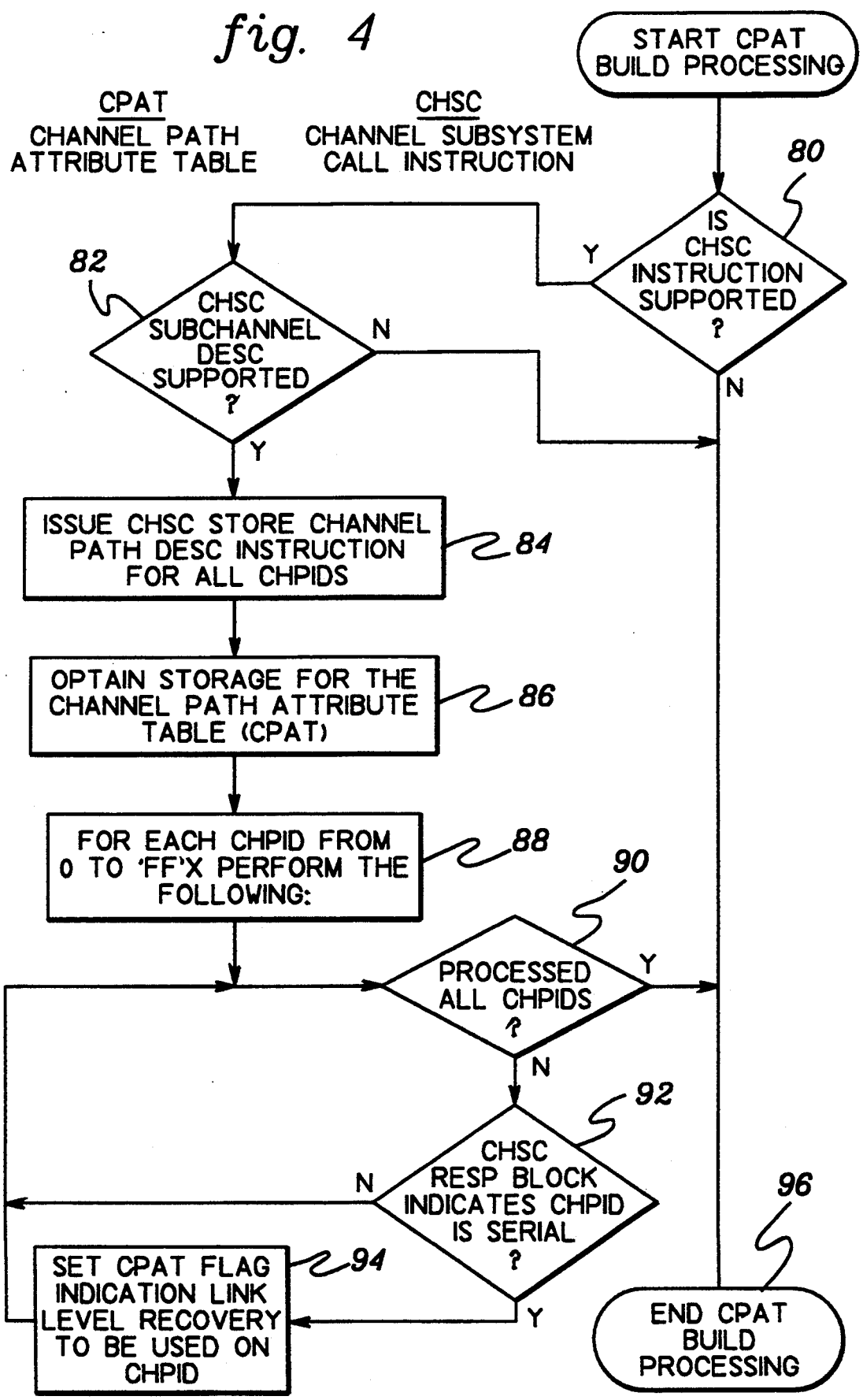
FIG. 4 is a flowchart illustrating the steps involved in building a channel path attribute table (CPAT).

FIG. 4 shows the logic that the operating system uses during initialization in order to establish a table for storing data indicating whether each channel path is of the switched point-to-point I/O interface topology. As will be more fully appreciated below, this information will be used at a later time to determine whether a control unit level reset can be performed on a given channel. The data collected during the execution of this routine will be stored in a memory area of main storage 11 designated in FIG. 1 as CPAT 36.

The CPAT build processing routine begins with inquiry 80 as to whether the CHSC instruction is supported by the host system. If not, control unit level recovery operations are not possible and the program proceeds to instruction 96 where CPAT build processing is terminated. Assuming an affirmative response, the program proceeds to inquiry 82 which seeks to determine whether the CHSC store subchannel description instruction is supported. Again, unless that instruction is supported by the host system, it will not be possible to achieve the purposes of this invention and the program will proceed to instruction 96 ending CPAT build processing. Assuming that the response to inquiry 82 is affirmative, the program proceeds to instruction block 84 which calls for the issuance of the CHSC store channel path description for all CHPIDS. The program proceeds to obtain storage for the CPAT in the main storage 11. Next, for each CHPID, the program proceeds to loop from instruction block 88, through questions 90 and 92 and instruction block 94. Question 92 seeks to determine whether a particular channel being processed is serial. If not, nothing needs to be done. If it is, however, an appropriate CPAT flag is set indicating that link level or control unit level recovery may be used on that particular CHPID. Once all the CHPID's have been processed in this way, the program proceeds to instruction 96 thus ending the CPAT build processing routine.

Building Control Unit Link Addresses (CULA's)

Figure 5:
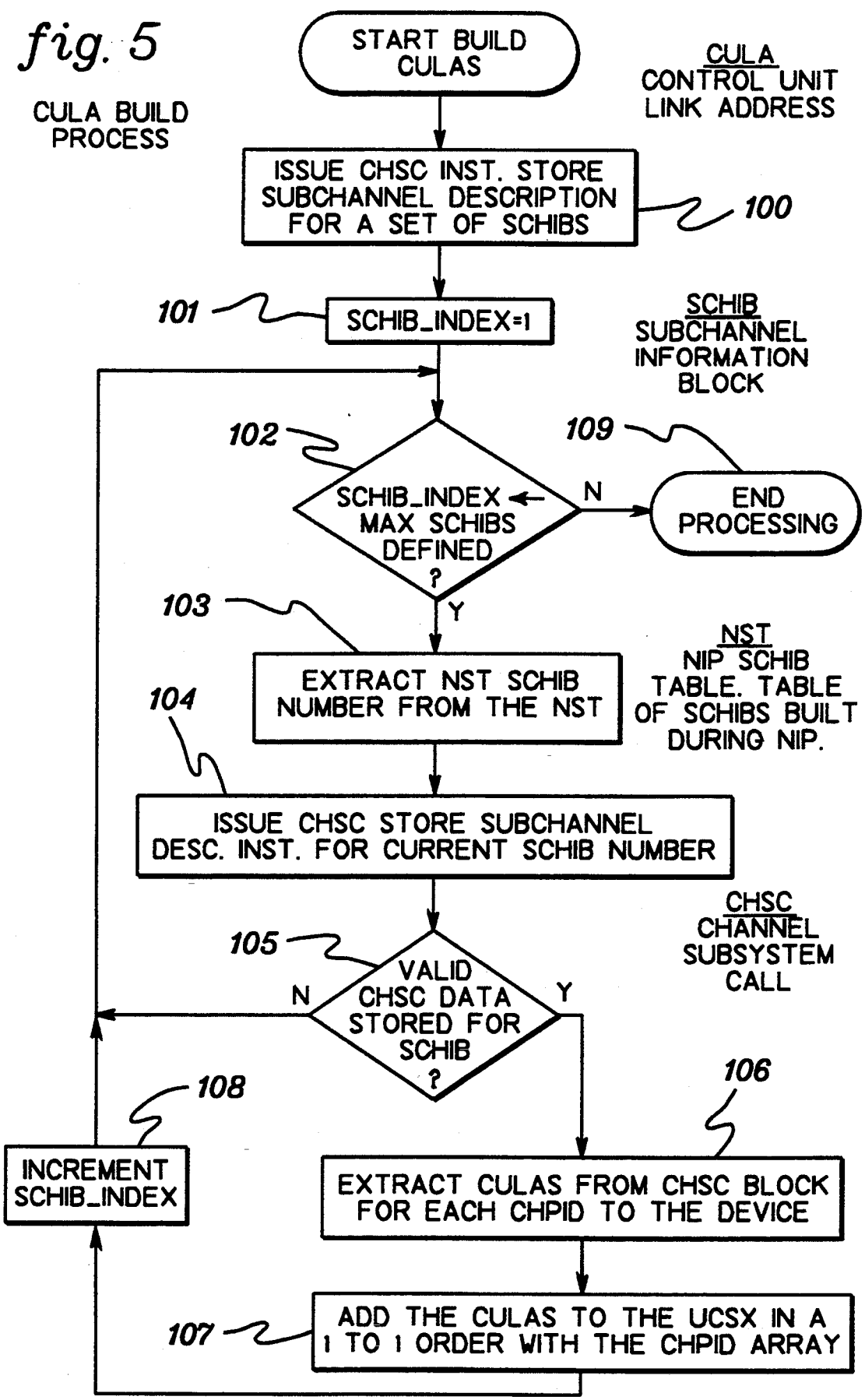
FIG. 5 is a flowchart illustrating the process steps followed in building the control unit link addresses (CULA's) in the unit control blocks (UCB's) for use in practicing the subject invention.

FIG. 5 is a flowchart that shows the logic that the operating system uses during initialization in order to understand which devices belong to which control units, and to which CHPID each control unit belongs. This involves determining and storing the control unit link addresses (CULA's) for each device. As described below, this information is used later when it is desired to formulate an RCU command to a particular control unit. The data collected during the execution of this routine will be stored in the UCB's 35 found in main storage 11. Block 100 is a description or title block which identifies the routine of FIG. 5 as a routine for issuing store-subchannel-description CHSC commands for a set of subchannel information blocks (SCHIB's). The SCHIB's are well understood in the art and identify the CHPID's in the CSS. In response to these CHSC commands, the CSS returns information which includes data that identifies the set of link addresses for the control units that belong to each CHPID.

At 101, the SCHIB index is set to one. At 102, a check is made to determine if the index is less than or equal to the maximum. This provides a loop for looping through all of the SCHIB's. If the check at 102 is yes, the operating system goes to 103 wherein the first subchannel number is extracted from the NIP SCHIB table (NST). The NST is built to contain a copy of each subchannel for the system image. At 104, the store-subchannel-description CHSC command is issued for the subchannel number extracted at 103 from the current SCHIB. A check is made at 105 to determine if the CHSC data returned as a result of the command issued at 104 is valid. If not, the operating system loops back to 102.

If the data is valid at 105, the operating system goes to 106 to extract the control unit link address (CULA) from the response block of the CHSC command for each CHPID to each device in the response block. This extracted CULA is stored in unit control block extensions (UCBX) for unit control blocks (UCB's) 35 which were previously built by the operating system to represent, in software, devices in the I/O system, as well understood in the art.

At 108, the SCHIB index is incremented by one, and the operating system loops to 102 to continue with the next SCHIB. If the index is not less than or equal to the maximum at 102, the operating system goes to 109 to end this routine. The result of this routine is that all of the CULAs for all of the devices will be known for all of the CHPID's in the CSS.

Fielding Error Signal

Figure 6:
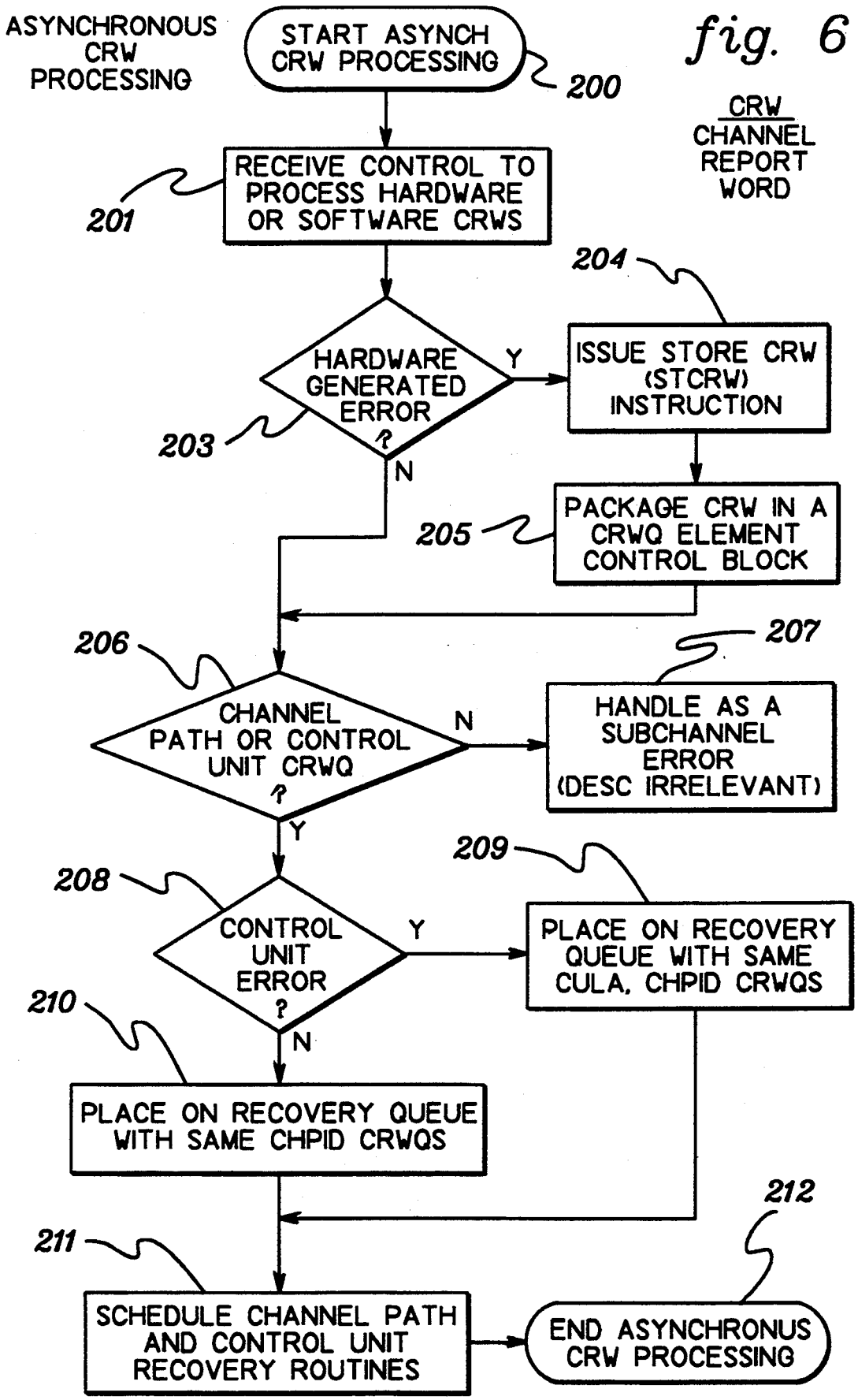
FIG. 6 is a flowchart illustrating the process steps followed in processing a channel report word (CRW).

FIG. 6 is a flowchart showing the logic followed by the software in the asynchronous processing of a channel report word. This procedure is used after the software has determined that an error of some kind has occurred. Different errors require different corrective actions and some errors are more important than others. Thus, the purpose of the routine illustrated in FIG. 6 is to prioritize and schedule the appropriate recovery routines to handle the various kinds of errors that occur. At 200, the procedure of FIG. 6 starts to asynchronously process a channel report word (CRW). As indicated by label 201, the procedure receives control to process hardware or software CRW's. This routine is invoked when an interrupt is received by the CPU13 (FIG. 1) indicating that a CRW is to be processed. At 203, a check is made to determine if the interrupt is from a hardware generated error from the hardware of the CSS. If yes, the operating system goes to 204 to issue a store CRW instruction to retrieve information that indicates what kind of error report is pending. Program control then flows to instruction 205 which calls for packaging the CRW in a CRWQ queue element control block. In effect, this gives the CRW a sequence number and places the CRW in a larger storage area in anticipation of additional information which will be gathered. The program then branches on the question as to whether the CRW in question is a channel path or a control unit CRW. If it is neither, the flow proceeds to instruction 207 where the error would be handled as a subchannel error, the description of which is not relevant to the subject invention. If the response to decision 206 is affirmative, however, flow proceeds to decision 208 which inquires as to whether the error in question is a control unit error. If the answer is affirmative, the CRWQ is placed on a recovery queue having the same CULA and CHPID information, as indicated by instruction 209. If the response to inquiry 208 is negative, thus indicating that the error is not a control unit error, the data is placed on a recovery queue with the same CHPID. At this point, it will be understood that two queues have been created, one for control unit recoveries and one for channel path recoveries. The flow then proceeds to instruction 211 which calls for scheduling the channel path and control unit recovery routines. The CRW routine then ends as indicated by label 212.

Channel Path and Control Unit Recovery Processing

Figure 7:
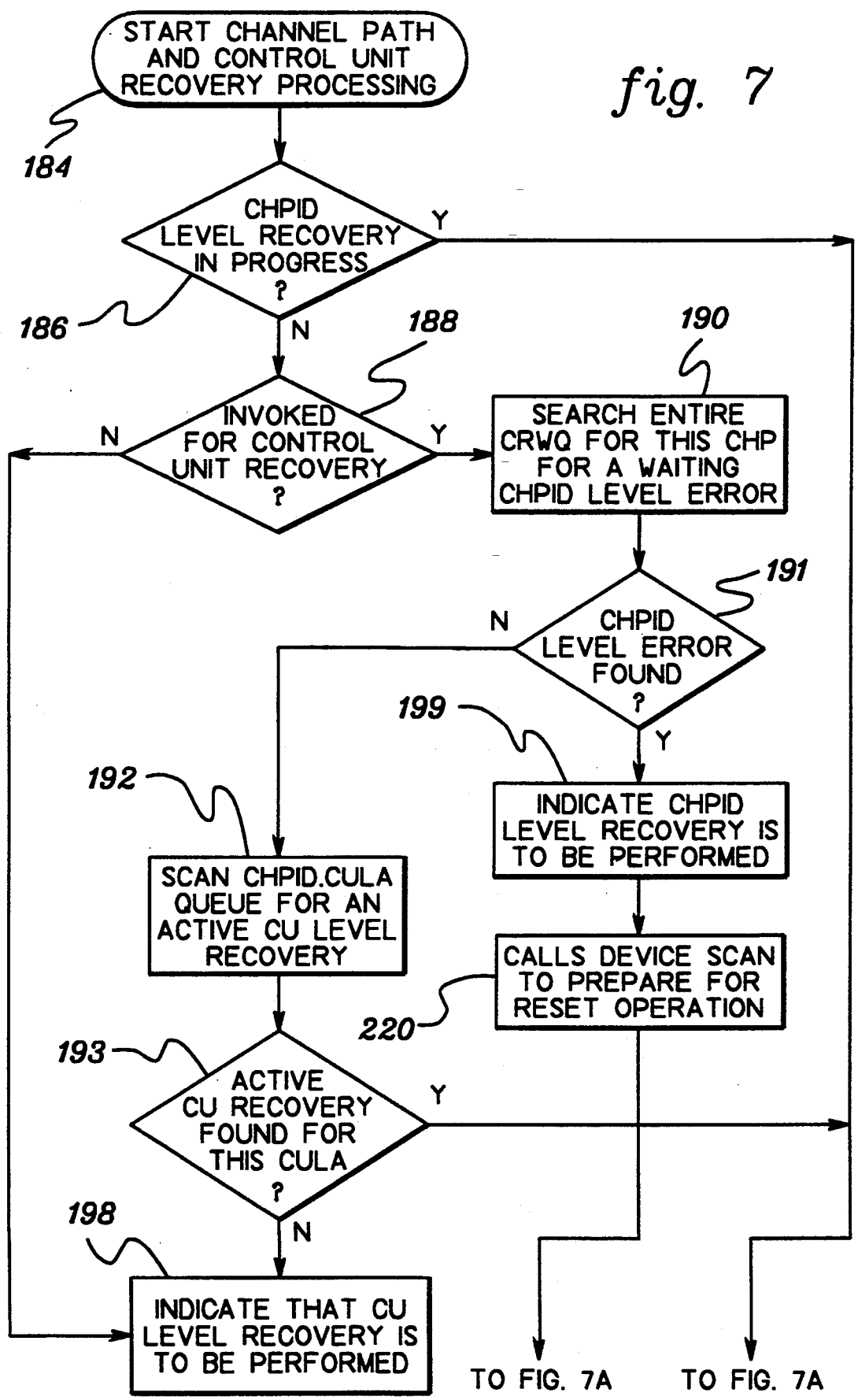
FIGS. 7 and 7A depict a flowchart illustrating the process steps followed in channel path and control unit recovery processing.
Figure 7A:
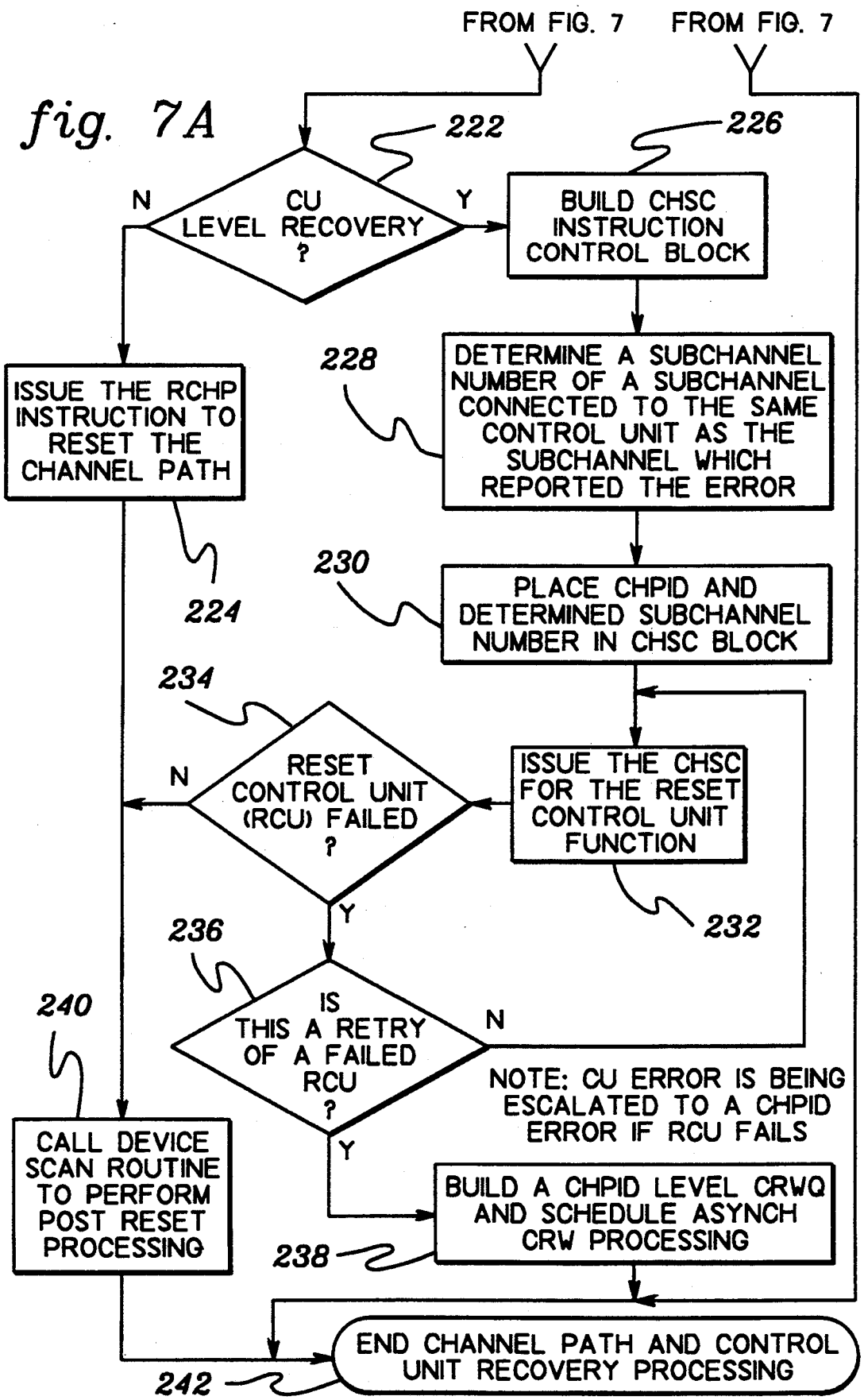

FIGS. 7 and 7a contain a flowchart illustrating the steps executed by the software to examine the current state of recovery and to determine whether a control unit recovery should be started. If, for example, a channel path recovery is scheduled to occur, then a decision will be made to delete a control unit recovery since the control unit would automatically be reset in a channel path recovery. Also, if a control unit recovery is already active for the control unit under consideration, recovery would then be bypassed.

In block 184, control is received from the asychronous CRW processor to process the control unit or channel path CRW queue created as described above with reference to FIG. 6. The program then proceeds to question 186 which inquires for each CRW as to whether there is a channel path recovery in progress. If so, the flow would proceed to the end of the routine as indicated by instruction 242 because there would be no need for another recovery operation. If the response to inquiry 186 is negative, however, the program proceeds to inquiry 188 which asks whether the CRW being processed is for a control unit recovery. If the answer is affirmative, the program proceeds to instruction 190 which calls for searching the entire CRW queue for the channel path under consideration in order to determine whether there is a waiting CHPID level error to be processed which would affect the control unit in question. The program then branches at 191 on that question. If no CHPID level error CRW is found, the flow proceeds to instructions 192 which calls for scanning the CHPID, CULA queue for an active control unit level recovery. The program then branches on that question and flow proceeds to the end of the routine at block 242 if the response is affirmative because there would be no further need for a recovery operation on the involved control unit. Should the response to inquiry 193 be negative, program control flows to block 198 indicating that a control unit level recovery is to be performed. Had the response to inquiry 191 been affirmative, the program would have proceeded to block 199 indicating that a CHPID level recovery is to be performed. Following the completion of the instructions in blocks 198 and 199, the program proceeds to instruction block 220 which calls device scan routine to prepare for a reset operation. The device scan routine will be described below with reference to FIG. 8. The program branches at inquiry 222 which seeks to determine whether the recovery in question is a control unit level recovery. If the answer is negative, the program proceeds to block 224 which calls for the issuance of a reset channel path instruction (RCHP). If the response to inquiry 222 is affirmative, the program proceeds to instruction 226 which calls for the building of a CHSC instruction control block. The program executes instruction 228 which determines the subchannel number of any device associated with the control unit attached to the particular device which was reported to have an error. This number is thus extracted from the CRWQ and then placed in a CHSC block along with the CHPID number as indicated in block 230. Next, the software will issue the CHSC for the reset control unit function as indicated by block 232. This function will be explained with reference to FIG. 9. The program then inquires at question 234 as to whether the reset control unit command failed. If it did, the program then inquires as to whether the command was a retry of a failed RCU at decision 236. If not, the program will return the control to block 232 for a retry. If, however, the failed RCU command was a retry, the program will proceed from decision 236 to instruction 238 which escalates the control unit error to a channel path error by building a CHPID level CRW queue element and schedules the error for asynchronous CRW processing, thus ending the path and control unit recovery processing as indicated by label 242. If decision 234 is negative, the program proceeds to instruction 240 which calls the device scan routine to perform post reset processing.

Device Recovery Scan

FIG. 8 is a flowchart illustrating the steps followed by the software in performing a device scan. The overall purpose of this routine is to scan the UCB's 35 in main storage 11 to determine which devices and control units will be affected by a given type of recovery. If the recovery in question is a channel path recovery, it would be necessary to quiesce all devices on all control units that would be affected. Similarly, a control unit recovery (RCU) would affect all of the devices attached to it and, therefore, such devices must be quiesced.

The device scan routine begins at block 229 containing an instruction to set up a scan of the UCB's 35 (FIG. 1) to search all devices in the system with respect to the recovery operation being processed to determine how many of them have matching CHPID's and CULA's and will thus be affected by the intended recovery operation. Until all such devices have been scanned, the response to inquiry 231 will be affirmative and the program will proceed to inquiry 233 which asks whether the device being scanned is connected to the channel path which is in error. If not, nothing needs to be done. If so, then the program proceeds to question 235 which inquires as to whether a control unit level recovery is being performed. A negative answer indicates that a channel path recovery is being done and since the affirmative answer to question 233 indicated that the device being scanned is connected to the channel in question, it will be affected by the reset. Thus, a negative answer to inquiry 235 results in the addition of the scanned device to the list of devices which will be affected by the recovery as indicated in block 239. If the response to inquiry 235 is affirmative, it is necessary to raise the question as to whether it is connected to the CULA in error as indicated by question 237. If so, then it must be added to the list of devices affected by the recovery. If not, the device will not be affected and, therefore, nothing needs to be done. Thus, the program would return to question 231 which inquires as to whether there are more devices to process. When there are none, the program proceeds to question 241 which asks whether the scan just completed is the first pass. If so, it means that it was called in response to instruction 220 in FIG. 7 preparatory to a reset operation. Under those circumstances, it is necessary to quiesce or suspend I/O activity to the list of devices to be affected by the reset in question through software blocking of future I/O requests to said devices, and to prevent any further I/O activity to be started until the recovery is complete, as indicated by instruction 243. Once that has been accomplished, the program terminates the device scan processing at block 251. If the pass in question is not the first pass, it would logically be the scan called at block 240 of FIG. 7a following a reset operation. The purpose of the second scan is to prepare the list of affected devices so that reserves can be restored and the devices prepared for normal I/O processing as indicated by blocks 247 and 249, following which the routine ends.

Channel Subsystem Reset Control Unit Processing

Figure 9:
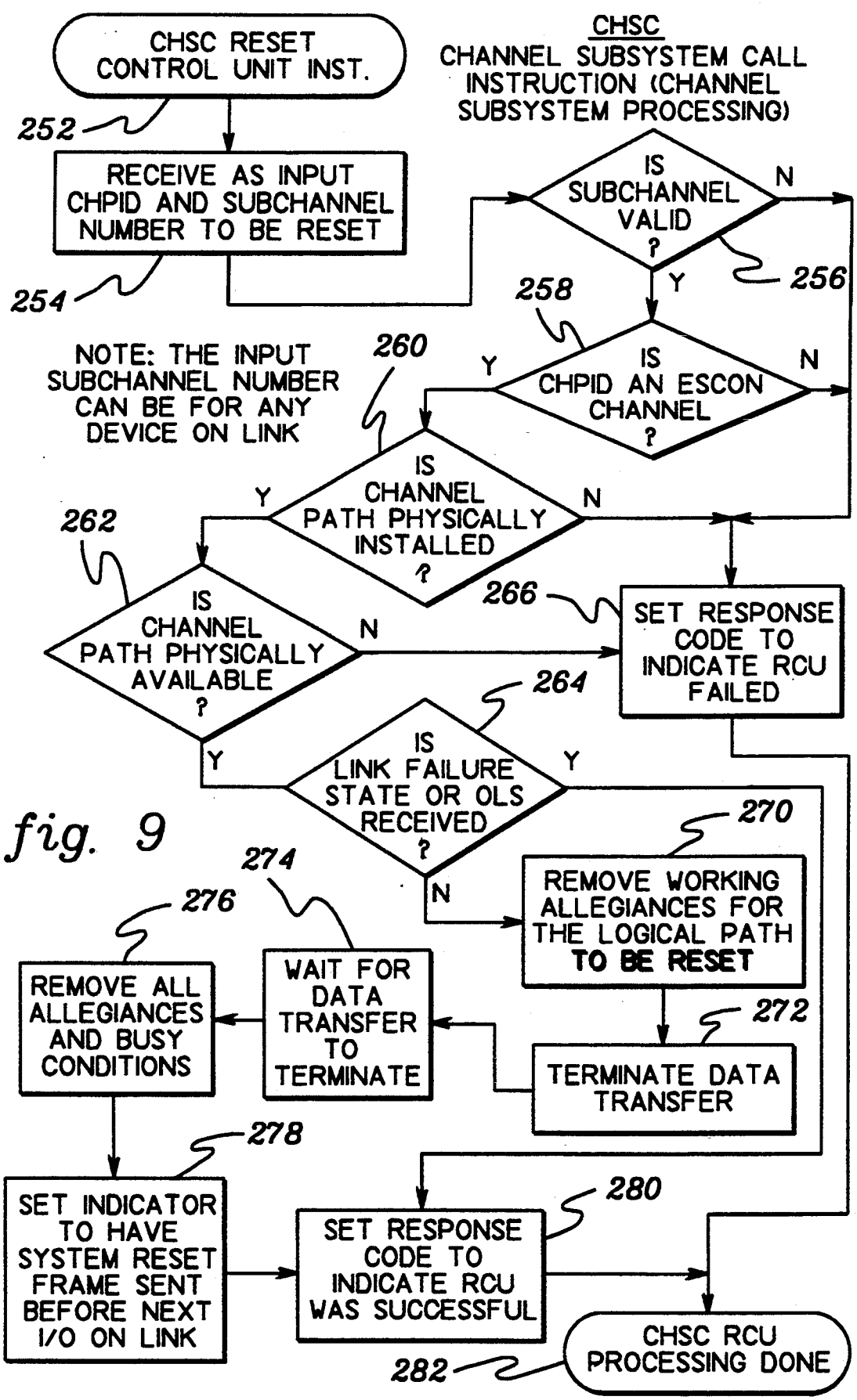
FIG. 9 is a flowchart illustrating the process steps followed in performing a control unit level recovery.

FIG. 9 is a flowchart illustrating the steps followed by the I/O processor 17 of the channel subsystem 12 in response to a CHSC reset control unit (RCU) command. The processor receives as input the CHPID and a subchannel number associated with the control unit to be reset. It should be understood that the subchannel number is any subchannel associated with the same control unit as the particular device that was reported to be in error, thus giving rise to the reset in question. This information is received from a 4096 byte block of storage containing an instruction to do a control unit reset. The address of the 4096 byte block in question is given to the I/O processor 17 (FIG. 1) by the software as part of the RCU command. The 4096 byte block is in the main storage unit 11 and is known as the channel subsystem call request and response block 19. The channel subsystem then proceeds to question 256 which inquires as to whether the given subchannel is valid. If not, a response code is set at instruction 266 to indicate that the RCU failed. Next, question 258 inquires as to whether the indentified channel is an ESCON channel or, more generally, whether the channel in question employs switched point-to-point topology as discussed above. If not, then a control unit reset cannot be performed and the channel subsystem would proceed to instruction block 266 as before. Question 260 inquires as to whether the channel path in question is physically installed. Again, if not, the program proceeds to instruction 266. Question 262 inquires as to whether the channel path in question is physically available. If not, the channel subsystem proceeds to instruction 266. It will be recalled with reference to the discussion for FIG. 7 that failed RCU operations will be rescheduled as channel path level recoveries.

Assuming however that the response to all of the inquiries is affirmative, the channel subsystem proceeds to process question 264 which inquires as to whether the indentified link is already in a failure state or whether the control unit is in an offline sequence. If either condition is true, there would be no need for a reset because a reset is automatically done in such cases. The channel subsystem proceeds to instruction 280 which calls for the setting of a response code to indicate that the RCU was successful. Assuming, however, that neither of these conditions would be true, the channel subsystem proceeds to instruction block 270 which calls for the removal of working allegiances for the logical path to be reset. Next, the channel subsystem proceeds to instruction 272 which calls for the termination of data transfer and to instruction 274 which calls for waiting for the data transfer to terminate. Once these steps have been accomplished, the channel subsystem proceeds to instruction 276 which again calls for the removal of other allegiances (i.e., working allegiances) and busy conditions. Next, the channel subsystem proceeds to instruction 278 which calls for the setting of a flag to have the system reset frame, as described with respect to FIGS. 3a and 3b, sent from the I/O processor to the switch 37 (FIG. 1) and the affected control unit. Once that has been done, the routine calls for setting a response code to indicate that the RCU was successful. It may be noted that the actual reset will not occur until I/O activity is requested on the affected link. The advantage of not actually processing the control unit recovery further at this point is that there may be other device errors, perhaps occurring later, which would require the same recovery operation. Thus, by postponing the recovery operation as noted, greater efficiency is achieved.

As a final point, it will be appreciated by those skilled in the art that the foregoing disclosure of this invention teaches a new and improved method and apparatus allowing the program to communicate directly with individual control units. More specifically, such communications can be effected using an appropriate CHPID and any subchannel number for a device attached to the control unit in question.

There are many modifications which can be made to the above-described preferred embodiment of this invention without departing from its spirit. It is intended to encompass all such modifications within the scope of the following claims.

What is claimed is:

1. A method for initiating a reset operation at a control unit level of a particular control unit and devices attached thereto, said control unit and/or a device attached thereto having a reported error status and said control unit residing in a data processing system, said method comprising the steps of:
    (a) determining and storing all CHPIDs and CULAs for each device in the system;
    (a) formulating a reset-control-unit command addressed to a particular control unit for triggering reset thereof;
    (c) scanning the stored CHPIDs and CULAs to find those devices having a CHPID and CULA matching a CHPID and CULA over which the intended reset command will be sent;
    (d) suspending I/O activity of affected devices before transmitting the reset command;
    (e) transmitting said reset command to the particular control unit; and
    (f) reactivating the I/O activity of the affected devices after transmitting the reset commands.

2. The method of claim 1 wherein the system includes SCHIBs for all subchannels and the steps of determining and storing (a) include the step of issuing a store-subchannel-description command.

3. The method of claim 1 wherein the system includes at least one channel path which is not configured for the transmission of commands exclusively to single control units connected thereto and wherein the method further comprises the preliminary step of confirming that the channel path over which the error status was reported is configured for direct transmission of commands exclusively to the particular control unit.

4. The method of claim 3 wherein the confirming step includes the step of building a CPAT for all channel paths upon initialization of the system.

5. The method of claim 4 wherein the building step includes the step of issuing a store-channel-path-description command for all channel paths.

6. The method of claim 1 wherein the transmitting step is postponed until the control unit or device having a reported error status is requested to perform an I/O operation.

7. The method of claim 1 wherein the formulating step (b) includes the step of issuing a reset-control-unit command.

8. The method of claim 1 wherein the formulating step (b) is preceded by the step of confirming that there is no active or pending recovery operation in the system affecting the particular control unit.

9. The method of claim 1 wherein the formulating step includes the step of determining a subchannel number of any device connected to the same control unit as a subchannel which reported the error.

10. Apparatus for initiating a reset operation at a control unit level of a particular control unit and devices attached thereto, said control unit and/or a device attached thereto having a reported error status and said control unit residing in a data processing system, said apparatus comprising:
  (a) means for determining and storing all CHPIDs and CULAs for each device in the system;
  (b) means for formulating a reset-control unit command addressed to a particular control unit for triggering reset thereof;
  (c) means for scanning the stored CHPIDs and CULAs to find those devices having a CHPID and a CULA matching a CHPID and CULA over which the intended reset command will be sent;
  (d) means for suspending I/O activity of affected devices before transmitting the reset command;
  (e) means for transmitting said reset command to the particular control unit; and
  (f) means for reactivating the I/O activity of the affected devices after transmitting the reset command.

11. The apparatus of claim 10 wherein the system includes SCHIBs for all subchannels and means for determining and storing (a) include means for issuing a store-subchannel-description command.

12. The apparatus of claim 10 wherein the system includes at least one channel path which is not configured for the transmission of commands exclusively to single control units connected thereto and wherein the apparatus further comprises means for confirming that the channel path over which the error status was reported is configured for direct transmission of commands exclusively to the particular control unit.

13. The apparatus of claim 12 wherein the confirming means includes means for building a CPAT for all channel paths upon initialization of the system.

14. The apparatus of claim 13 wherein the building means includes means for issuing a store-channel-path-description command for all channel paths.

15. The apparatus of claim 10 further including means for postponing the transmission of said reset command until the control unit or device having a reported error status is requested to perform an I/O operation.

16. The apparatus of claim 10 wherein the formulating means (a) includes means for issuing a reset-control-unit command.

17. The apparatus of claim 10 further comprising means for confirming that there is no active or pending recovery operation in the system affecting the particular control unit.

18. The apparatus of claim 10 wherein the formulating means includes means for determining a subchannel number of any device connected to the same control unit as a subchannel which reported the error.

19. A method for effecting communications from the program of a data processing system to a particular control unit for triggering a control unit level operation at said particular control unit, said method comprising the steps of:
  (a) determining and storing all CHPIDs and CULAs for each device in the system;
  (b) formulating a control unit operation command addressed to the control unit for triggering said operation at said control unit, the address of said command including a connecting channel path and the number of any subchannel connected to said control unit;
  (c) scanning the stored CHPIDs and CULAs to find those devices having a CHPID and CULA matching a CHPID and CULA over which the intended operation command will be sent;
  (d) suspending I/O activity of affected devices before transmitting the operation command;
  (e) transmitting said operation command to the particular control unit; and
  (f) reactivating the I/O activity of the affected devices after transmitting the operation command.

20. Apparatus for effecting communication from the program of a data processing system to a particular control unit for triggering a control unit level operation at said particular control unit, said apparatus comprising:
  (a) means for determining and storing all CHPIDs and CULAs for each device in the system;
  (b) means for formulating a control unit operation command addressed to the control unit for triggering said operation at said control unit, the address of said command including a connecting channel path and the number of any subchannel to said control unit;
  (c) means for scanning the stored CHPIDs and CULAs to find those devices having a CHPID and a CULA matching a CHPID and CULA over which the intended operation command will be sent;
  (d) means for suspending I/O activity of affected devices before transmitting the operation command;
  (e) means for transmitting said operation command to the particular control unit; and
  (f) means for reactivating the I/O activity of the affected devices after transmitting the operation command.

* * * * *

UNITED STATES PATENT AND TRADEMARK OFFICE
CERTIFICATE OF CORRECTION

PATENT NO. : 5,423,026
DATED : June 6, 1995
INVENTOR(S) : Cook et al.

It is certified that error appears in the above-indentified patent and that said Letters Patent is hereby corrected as shown below:

Column 3, line 12, "FIG. 8 is" should read "FIGS. 8 and 8A depict a".

Column 14, line 36, "(a)" should read "(b)".

Claim 16, line 2 "means (a)" should read "means (b)".

Signed and Sealed this

Third Day of October, 1995

BRUCE LEHMAN

Attest:

Attesting Officer

Commissioner of Patents and Trademarks